(12) United States Patent
Harvey et al.

(10) Patent No.: US 11,915,306 B1
(45) Date of Patent: Feb. 27, 2024

(54) SYSTEM AND METHODS FOR DETERMINING RENTAL ELIGIBILITY BASED ON CONTEXTUAL TELEMATICS DATA

(71) Applicant: STATE FARM MUTUAL AUTOMOBILE INSURANCE COMPANY, Bloomington, IL (US)

(72) Inventors: Brian N. Harvey, Bloomington, IL (US); Joseph Robert Brannan, Bloomington, IL (US); J. Lynn Wilson, Normal, IL (US); Matthew Eric Riley, Sr., Heyworth, IL (US); Ryan Gross, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 464 days.

(21) Appl. No.: 16/267,023

(22) Filed: Feb. 4, 2019

(51) Int. Cl.
*G06Q 30/0645* (2023.01)
*B60W 40/04* (2006.01)
*B60W 40/06* (2012.01)
*B60W 40/09* (2012.01)

(52) U.S. Cl.
CPC ......... *G06Q 30/0645* (2013.01); *B60W 40/04* (2013.01); *B60W 40/06* (2013.01); *B60W 40/09* (2013.01)

(58) Field of Classification Search
CPC .... G06Q 30/0645; G06Q 40/08; G06Q 10/02; B60W 40/04; B60W 40/06; B60W 40/09; B60W 40/08; B60W 40/10
See application file for complete search history.

(56) References Cited

U.S. PATENT DOCUMENTS

| 7,996,282 B1 | 8/2011 | Scott et al. |
| 9,087,099 B2 | 7/2015 | Camacho et al. |
| (Continued) | | |

FOREIGN PATENT DOCUMENTS

| JP | WO2011139363 A1 | 11/2011 |
| WO | WO-2017142536 A1 | 8/2017 |
| (Continued) | | |

OTHER PUBLICATIONS

Griffiths, "Telematics is revolutionising fleet management", Connected Car, Financial Times. 1-4 (2016).
(Continued)

*Primary Examiner* — Aryan E Weisenfeld
(74) *Attorney, Agent, or Firm* — Lee & Hayes, P.C.

(57) ABSTRACT

Embodiments described herein, inter alia, receive telematics data collected over a period of time, wherein the telematics data is indicative of operation of a vehicle by a potential renter during the period of time; identify, upon analyzing the telematics data, driving behavior(s) of the renter during the period of time; determine, for each driving behavior, a corresponding state of an environment of the vehicle when the driving behavior occurred; determine renter eligibility value(s) for the renter based on the driving behavior(s) and the corresponding state of an environment of the vehicle; compare the renter eligibility value(s) to user preference value(s) of a profile of a vehicle owner, wherein the user preference value(s) define one or more criteria for vehicle renters with whom the vehicle can be shared; and cause an indication of the vehicle associated with the profile to be displayed only if the renter satisfies the criteria.

20 Claims, 5 Drawing Sheets

(56) References Cited

U.S. PATENT DOCUMENTS

| | | | |
|---|---|---|---|
| 9,311,271 | B2 | 4/2016 | Wright |
| 9,633,487 | B2 | 4/2017 | Wright |
| 10,013,697 | B1 | 7/2018 | Cote et al. |
| 10,026,237 | B1* | 7/2018 | Fields ............... G08G 1/164 |
| 10,192,369 | B2 | 1/2019 | Wright |
| 10,198,879 | B2 | 2/2019 | Wright |
| 10,810,504 | B1* | 10/2020 | Fields ............... G06N 5/048 |
| 10,831,859 | B2 | 11/2020 | Van Wiemeersch et al. |
| 11,257,146 | B1 | 2/2022 | Harvey |
| 2007/0244589 | A1 | 10/2007 | Oku et al. |
| 2009/0254971 | A1 | 10/2009 | Herz et al. |
| 2010/0287030 | A1 | 11/2010 | Sinha et al. |
| 2011/0288891 | A1 | 11/2011 | Zaid et al. |
| 2012/0330696 | A1 | 12/2012 | Clark et al. |
| 2013/0321178 | A1 | 12/2013 | Jameel et al. |
| 2013/0325521 | A1 | 12/2013 | Jameel et al. |
| 2014/0129301 | A1 | 5/2014 | Van Wiemeersch et al. |
| 2015/0120489 | A1 | 4/2015 | Edelman |
| 2015/0149221 | A1 | 5/2015 | Tremblay |
| 2015/0213420 | A1 | 7/2015 | Krishnamurthy et al. |
| 2015/0317844 | A1 | 11/2015 | Choi et al. |
| 2015/0371153 | A1 | 12/2015 | Lohmeier et al. |
| 2016/0071177 | A1 | 3/2016 | Launay |
| 2016/0363935 | A1 | 12/2016 | Shuster et al. |
| 2017/0091856 | A1 | 3/2017 | Canberk et al. |
| 2017/0098231 | A1 | 4/2017 | Dietrich |
| 2017/0144671 | A1 | 5/2017 | Memani et al. |
| 2017/0206717 | A1 | 7/2017 | Kuhnapfel |
| 2018/0053133 | A1 | 2/2018 | Maheshwari et al. |
| 2018/0075380 | A1* | 3/2018 | Perl ................ G06Q 50/30 |
| 2019/0244261 | A1 | 8/2019 | Sakurada et al. |
| 2019/0351768 | A1 | 11/2019 | Salter et al. |
| 2020/0118215 | A1 | 4/2020 | Rao et al. |
| 2020/0164891 | A1* | 5/2020 | Bender ............. B60W 50/0097 |
| 2022/0058670 | A1 | 2/2022 | Harvey et al. |
| 2022/0172280 | A1 | 6/2022 | Harvey et al. |
| 2022/0258740 | A1 | 8/2022 | Harvey et al. |

FOREIGN PATENT DOCUMENTS

| | | | | |
|---|---|---|---|---|
| WO | WO2018127968 | * | 7/2018 | ......... G06Q 30/0645 |
| WO | WO2018127968 | A1 | 3/2019 | |

OTHER PUBLICATIONS

Hampshire et al., "Market Analysis and Potential Growth", Peer-to-Peer Carsharing, Transportation Research Record Journal of the Transportation Research Board. 119-126 (2011).

Goodwin, "OECD International Transport Forum, Leipzig, May 2008 Transport and Energy: The Challenge of Climate Change", Policy Incentives to Change Behaviour in Passenger Transport, The Centre for Transport & Society. 1-34 (2008).

Kantor, "Design of Algorithms for Payment Telematics Systems Evaluating Driver's Driving Style", Transactions of Transport Sciences, 7:9-16 (2014).

Mortimer, "The effect of 'smart' financial incentives on driving behaviour of novice drivers", Accident Analysis and Prevention, 119:68-79 (2018).

Mearian, Lucas "Insurers Will now be Able to Track Driver Behavior via Smartphones", Sep. 3, 2014, IDG Communications, Inc., 13 pages.

Eftekhari et al, An inference engine for smartphones to preprocess data and detect stationary and transportation modes, Transportation Research Part C, Apr. 20, 2016, 15 pages.

Yi et al,"A machine learning based personalized system for driving state recognition", Transportation Research Part C; Emerging Technologies, vol. 105, year 2019, 27 pages.

Office Action for U.S. Appl. No. 16/880,264, dated Aug. 4, 2021, Harvey, "System and Methods for Determining Owner's Preferences Based on Vehicle Owners Telematics Data", 17 Pages.

Office Action for U.S. Appl. No. 16/266,879, dated Jul. 21, 2021, Harvey, "Incentivizing and/or Penalizing Vehicle Renters Based on Telematics Data", 11 pages.

Office Action for U.S. Appl. No. 17/673,106, dated Oct. 5, 2022, Harvey, "Incentivizing and/or Penalizing Vehicle Renters Based on Telematics Data", 18 pages.

Office Action for U.S. Appl. No. 17/516,804, dated Mar. 1, 2023, Harvey, "System and Methods for Predicting Rental Vehicle Use Preferences", 13 pages.

Office Action for U.S. Appl. No. 17/673,106, dated May 8, 2023, Incentivizing and/or Penalizing Vehicle Renters Based on Telematics Data, 9 pages.

Office Action for U.S. Appl. No. 17/739,730, dated Aug. 17, 2023, Harvey, "System and Methods for Determining Owner's Preferences Based On Vehicle Owners Telematics Data", 11 pages.

Office Action dated Jan. 7, 2021 for U.S. Appl. No. 16/266,879, "Incentivizing and/or Penalizing Vehicle Renters Based on Telematics Data", Harvey, 14 pages.

Non Final Office Action dated Oct. 28, 2020 for U.S. Appl. No. 16/266,986, "System and Methods for Predicting Rental Vehicle Use Preferences", Harvey, 26 pages.

Office Action dated Mar. 16, 2021 for U.S. Appl. No. 16/266,986, "System and Methods for Predicting Rental Vehicle Use Preferences", Harvey, 32 pages.

* cited by examiner

SYSTEM AND METHODS FOR DETERMINING RENTAL ELIGIBILITY BASED ON CONTEXTUAL TELEMATICS DATA

FIELD OF THE DISCLOSURE

The present disclosure relates to vehicle renting/sharing, and, more particularly, to determining renter eligibility based on contextual telematics data.

BACKGROUND

A peer-to-peer (P2P) car sharing model enables vehicle owners to rent their vehicles to others for short periods of time. Participating vehicle owners typically charge a fee to rent out their vehicles, and participating renters drive the vehicles and pay for the time they need to use them. The participating owners and renters may use a common vehicle-sharing platform, which may be in the form of a website or mobile application, to manage the scheduling of and payment for the vehicles.

Typically, a participating vehicle owner may use the vehicle-sharing platform to i) describe their vehicle(s), such as the make and model, that are available for rent, ii) set a location for pickup and return of the vehicle(s), and iii) mark available days of the week that their vehicle(s) are available for rent. Participating renters may access the vehicle-sharing platform to search for a vehicle to rent according to their criteria, such as the time period they will need to drive the vehicle, the type of desired vehicle, price, etc. The success of such a vehicle-sharing platform often depends on a sense of trust between the participating vehicle owners and renters. To build trust, vehicle-sharing platforms typically require the participating vehicle owners and renters to verify their identities, such as by entering in their license number and credit card information. Vehicle-sharing platforms may also set general expectations that apply to all participating renters, such as a no smoking policy in the vehicle.

Despite the high-level trust mechanisms mentioned above that are already in place, conventional vehicle-sharing platforms lack low-level trust mechanisms. For example, recently proposed vehicle-sharing platforms are unable to generate and enforce personal preferences onto participating renters to allow only a subset of the participating renters to rent an owner's vehicle or, at best, allow only high-level filtering mechanisms (e.g., by only enabling owners to filter according to overall reviews/ratings that other owners have given to the renters in the past). In one scenario, although all verified participating renters have approved driving histories, participating vehicle owners may only trust participating renters that have a higher standard of driving etiquette. Existing vehicle-sharing platforms simply do not include a means for generating and enforcing these sorts of personal preferences onto participating renters. Such shortcomings have to date been inadequately addressed, if at all.

BRIEF SUMMARY

In some aspects, embodiments described herein may, inter alia, determine renter eligibility for a prospective renter by analyzing telematics data indicative of operation of a vehicle by the prospective renter to identify one or more driving behaviors of the prospective renter. In addition, the telematics data and/or other data, such as environment data, may be analyzed to determine a state of an environment of the vehicle when the driving behavior occurred. For example, environment data may be weather data indicating that the prospective renter has experience driving in snowy terrain. In some embodiments, a baseline assumption may be made, in that the vehicle owner would desire to rent his or her vehicle to renters that are experienced in driving in conditions in which the prospective renter will likely have to drive, should an agreement between the prospective renter and vehicle owner be reached. For example, if a prospective renter that has primarily driven in Florida desires to rent a vehicle in Chicago during the winter season, the owner of the vehicle may not desire to rent out the vehicle to the prospective renter, believing that some driving experience in snowy conditions is a requirement for renting out the vehicle. As another example, if a prospective renter that has primarily driven in Los Angeles desires to rent a vehicle in Seattle, the owner of the vehicle may not desire to rent out the vehicle to the prospective renter, believing that some driving experience in rainy conditions is a requirement for renting out the vehicle. In yet another example, if a prospective renter that has primarily driven in a rural area desires to rent a vehicle in New York City, the owner of the vehicle may not desire to rent out the vehicle to the prospective renter, believing that some driving experience in urban traffic conditions is a requirement for renting out the vehicle. Accordingly, vehicle renters must satisfy renter eligibility requirements corresponding to driving contexts (e.g., weather conditions, traffic conditions) in order to be authorized to rent the owner's vehicle.

In one aspect, a computer-implemented method of determining renter eligibility may include (1) receiving, by the one or more processors, telematics data collected over a period of time, wherein the telematics data is indicative of operation of a vehicle by a potential renter during the period of time; (2) identifying, by the one or more processors analyzing the telematics data, one or more driving behaviors of the renter during the period of time; (3) determining, by the one or more processors, and for each driving behavior of the one or more driving behaviors, a corresponding state of an environment of the vehicle when the driving behavior occurred; (4) determining, by the one or more processors, one or more renter eligibility values for the renter based on the one or more driving behaviors and the corresponding state of an environment of the vehicle; (5) comparing, by the one or more processors, the one or more renter eligibility values to one or more user preference values of a vehicle-sharing platform profile of a vehicle owner, wherein the one or more user preference values define one or more criteria for vehicle renters with whom the vehicle can be shared; and (6) causing, by the one or more processors, an indication of the vehicle associated with the vehicle-sharing platform profile to be displayed only if the renter satisfies the one or more criteria In one aspect, a computer system implementing a vehicle-sharing platform may include (1) one or more processors and (2) memory coupled to the one or more processors and storing executable instructions that when executed by the one or more processors cause the computer system to: (a) receive telematics data collected over a period of time, wherein the telematics data is indicative of operation of a vehicle by a potential renter during the period of time; (b) identify, upon analyzing the telematics data, one or more driving behaviors of the renter during the period of time; (c) determine, for each driving behavior of the one or more driving behaviors, a corresponding state of an environment of the vehicle when the driving behavior occurred; (d) determine one or more renter eligibility values for the renter based on the one or more driving behaviors and the corresponding state of an environment of the vehicle; (e) compare the one or more renter eligibility values to one or more user preference values of a vehicle-sharing platform profile of a vehicle owner, wherein the one or more user preference values define one or more criteria for vehicle renters with whom the vehicle can be shared; and (f) cause an indication of the vehicle associated with the vehicle-sharing platform profile to be displayed only if the renter satisfies the one or more criteria.

In one aspect, a non-transitory, tangible computer-readable medium storing machine readable instructions that, when executed by one or more processors, may cause the one or more processors to (1) receive telematics data collected over a period of time, wherein the telematics data is indicative of operation of a vehicle by a potential renter during the period of time; (2) identify, upon analyzing the telematics data, one or more driving behaviors of the renter during the period of time; (3) determine, for each driving behavior of the one or more driving behaviors, a corresponding state of an environment of the vehicle when the driving behavior occurred; (4) determine one or more renter eligibility values for the renter based on the one or more driving behaviors and the corresponding state of an environment of the vehicle; (5) compare the one or more renter eligibility values to one or more user preference values of a vehicle-sharing platform profile of a vehicle owner, wherein the one or more user preference values define one or more criteria for vehicle renters with whom the vehicle can be shared; and (6) cause an indication of the vehicle associated with the vehicle-sharing platform profile to be displayed only if the renter satisfies the one or more criteria.

BRIEF DESCRIPTION OF THE DRAWINGS

The figures described below depict various aspects of the system and methods disclosed herein. It should be understood that each figure depicts an aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

Although the following text sets forth a detailed description of numerous different aspects, it should be understood that the legal scope of the description is defined by the words of the claims set forth at the end of this patent. The detailed description is to be construed as exemplary only and does not describe every possible aspect since describing every possible aspect would be impractical, if not impossible. Numerous alternative aspects may be implemented, using either current technology or technology developed after the filing date of this patent, which would still fall within the scope of the claims.

DETAILED DESCRIPTION

Generally, a method, apparatus, systems, and non-transitory media are described that may, inter alia, automatically determine rental eligibility for sharing the owner's vehicle with the potential vehicle renters who meet one or more user preference values associated with the owner. Rental eligibility may be determined based upon context-specific telematics data associated with the renter.

Exemplary Vehicle-Sharing Platform

Figure 1:
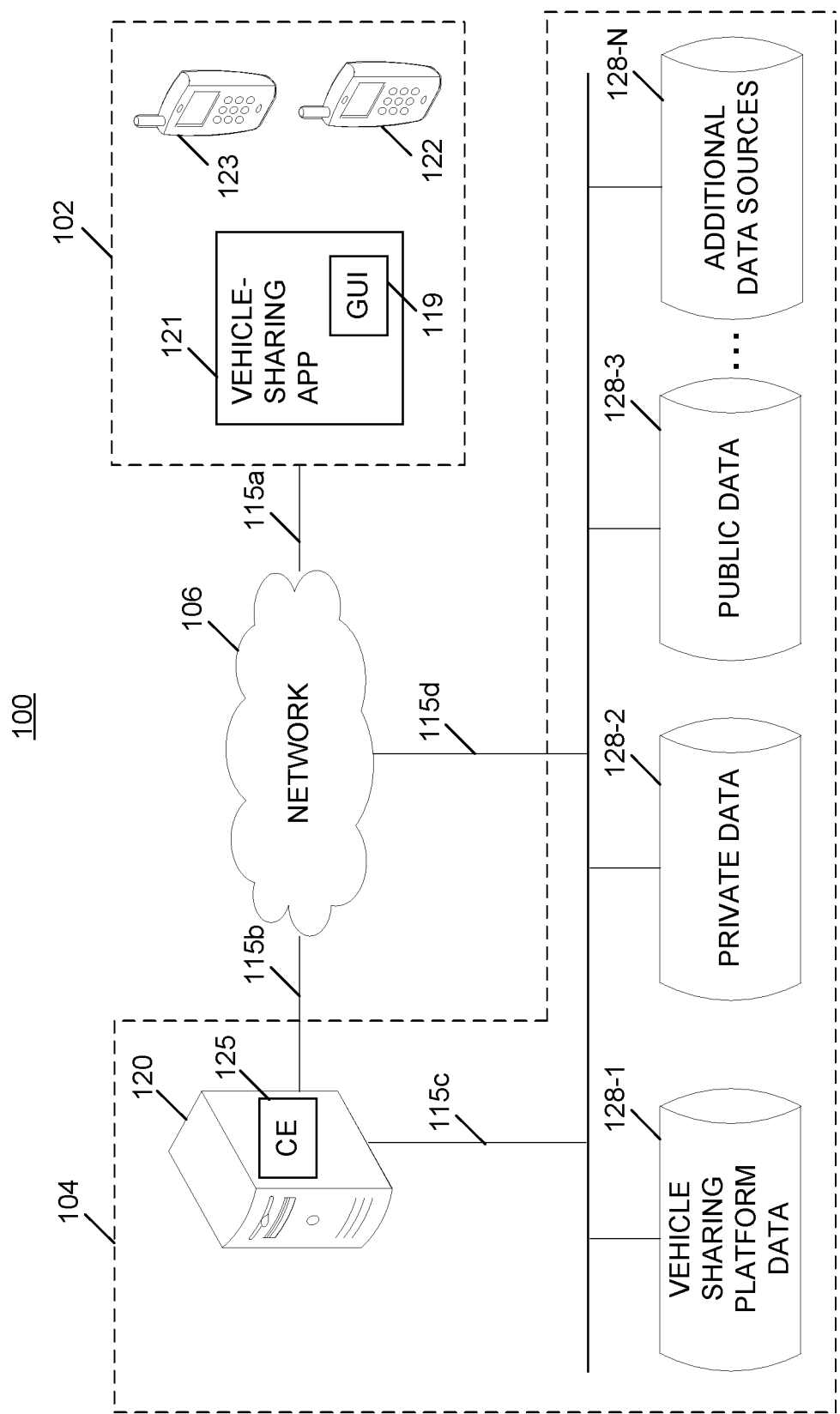
FIG. 1 illustrates a block diagram of an exemplary vehicle-sharing platform in accordance with one aspect of the present disclosure.

FIG. 1 illustrates a block diagram of an exemplary vehicle-sharing platform 100 in accordance with one aspect of the present disclosure. Vehicle-sharing platform 100 may include front end devices 102, a data system 104, and/or a network 106. The system may include additional, fewer, or alternate components, including those discussed elsewhere herein.

Vehicle-sharing platform 100 may facilitate the determination of renter eligibility for participating renters, and further manage the scheduling of and payment for owner's vehicles with participating renters that meet the renter eligibility. Generally, requests to rent vehicles from participating renters are only approved if the renters meet renter eligibility preferences. In some aspects, for participating renters to even be able to view vehicle(s) provided by a particular vehicle owner as available on the vehicle-sharing platform 100, participating renters must meet renter eligibility preferences, which the particular vehicle owner may have confirmed. Specifically, in order to determine the renter eligibility preferences, the platform 100 may be configured to identify one or more driving behaviors of a participating renter based on telematics data indicative of operation of a vehicle by the participating renter during a predefined period of time. In other aspects, the platform 100 may display the renter eligibility preferences (or parameters and/or values thereof) via a graphical user interface (GUI). In other aspects, the vehicle owner may modify the renter eligibility preferences, and therefore participating renters must meet the modified renter eligibility preferences to view available vehicle(s) provided by that vehicle owner.

Front end devices 102 may include devices 122 and 123. Each of devices 122, 123 may include any suitable communication device that is configured to facilitate user interaction and exchange data with network 106. For example, devices 122, 123 may be mobile devices (e.g., smartphones, cell phones, tablets, netbooks, phablets, smart glasses, smart contact lenses, electronic wearable devices, personal desktop computers, laptops, pagers, personal digital assistants, smart watches, and/or other computing devices capable of wired and/or wireless communication). In the embodiments discussed herein, device 122 belongs to a participating renter and device 123 belongs to a participating vehicle owner. Each of the devices 122, 123 may be configured to execute a vehicle-sharing application to facilitate renting/sharing of an owner's vehicle. As such, vehicle-sharing platform 100 may support a P2P vehicle sharing model that enables a participating vehicle owner to rent/share his vehicle to a participating renter for agreed upon periods of time. The vehicle-sharing applications executing on devices 122 and 123 may be considered to be front end interfaces associated with the vehicle-sharing platform 100. Accordingly, in various aspects, each of the devices 122, 123 may be any suitable device configured to display a graphical user interface (GUI) 119 within a dedicated application 121 (i.e., vehicle-sharing application) to enable users to interact with devices 122, 123. Although FIG. 1 illustrates GUI 119 as part of dedicated application 121, those of ordinary skill in the relevant art(s) will appreciate that vehicle-sharing platform 100 may be implemented in other ways without departing from the spirit and scope of the present disclosure. For example, application 121 may be a web browser application, and GUI 119 may be provided by JavaScript or other instructions of a web page stored on a remote server.

In various aspects, devices 122, 123 may be configured to receive data from, and send data to data system 104 via a wired or wireless link 115a and network 106. Notably, owner device 123 may facilitate collecting information from a user and communicating with data system 104 via network 106 to determine renter eligibility via vehicle-sharing application 121. Renter device 122 may be configured to receive data from data system 104 and to display an indication of (e.g., picture of, make/model of, etc.) the owner's vehicle(s) via GUI 119 if the user (i.e., renter) of the renter device 122 satisfies the renter eligibility preferences of the vehicle owner.

Network 106 may include any appropriate combination of wired and/or wireless communication networks. For example, network 106 may include any combination of a local area network (LAN), wireless local area network (WLAN), a metropolitan area network (MAN), a wide area network (WAN), and may facilitate a connection to the Internet. To provide further examples, network 106 may include wired telephone and cable hardware, satellite, cellular phone communication networks, etc.

Data system 104 may include a computing device 120 and N databases 128-1, 128-2, . . . 128-N. Although a single computing device 120 is illustrated in FIG. 1, one of ordinary skill in the art will understand that two or more computing devices 120 may be located across one or more locations. In some aspects, computing device 120 may be implemented with hardware and/or software components, some of which may facilitate communications with one or more databases 128-1, 128-2, . . . 128-N via any suitable number of wired and/or wireless links, such as 115b, 115c, and/or 115d.

The dedicated application 121 described above that is included in the front end devices 102 (e.g., devices 122, 123) may be associated with the computing device 120. Other various software applications installed in front end devices 102 (e.g., devices 122, 123), such as weather applications, map applications, etc., may be supported by the computing device 120 or other third party servers (e.g., commercial vendors, governmental entities, industry associations, non-profit organizations, or others). The computing device 120 may be configured to receive data from the various software applications of the front end devices 102 (e.g., by way of suitable application program interfaces) via network 106. Although additional wireless links are not shown in FIG. 1 for purposes of brevity, those of ordinary skill in the relevant art(s) will appreciate that computing device 120 may communicate with any of databases 128-1, 128-2, . . . 128-N using any combination of wired and/or wireless links. Furthermore, those of ordinary skill in the relevant art(s) will also appreciate that different types of networks and/or links may be implemented based upon the type of data that is accessed from a respective database 128-1, 128-2, . . . 128-N. For example, a private network and one or more secure links may be implemented to facilitate communications between computing device 120 and any of databases 128-1, 128-2, . . . 128-N (e.g., via link 115c) to enable computing device 120 to retrieve data of a sensitive, private, and/or proprietary nature. To provide another example, a link via the Internet may be implemented for communications between computing device 120 and any of databases 128-1, 128-2, . . . 128-N (e.g., via links 115c and 115d) to enable computing device 120 to retrieve data that is publicly available or not of a sensitive nature.

Although databases 128-1, 128-2, . . . 128-N are illustrated in FIG. 1 as separate databases and separate from computing device 120, in some aspects data stored in one or more of databases 128-1, 128-2, . . . 128-N is additionally or alternatively stored in one or more storage components integrated as part of (or otherwise associated with) computing device 120. Alternatively, or in addition, one or more of the databases 128-1, 128-2, . . . 128-N may be associated with a third party server.

In an aspect, one or more databases 128-1, 128-2, . . . 128-N may store historical data that describes driving behavior of a vehicle owner, or vehicle-sharing application usage patterns of the vehicle owner. For example, historical data may include traffic data, vehicle collision data (e.g., insurer claims data), geographic location data (e.g., GPS data), mobile device data, telematics data, vehicle mounted-sensor data, autonomous vehicle sensor data, environment data (e.g., weather data) and/or image data, which may be collected by the vehicle-sharing platform 100 by way of the computing device 120 and/or device 123, third party servers, and/or sensors associated with an owner's vehicle before, during, and/or after a trip. As such, historical data may provide contextual information of the vehicle related to vehicle damage, extent of injuries at a vehicle collision, number and identification of vehicles involved, dates and times of vehicle use, duration of vehicle use, mobile device GPS location, vehicle GPS location, speed, RPM or other tachometer readings of the vehicle, lateral and longitudinal acceleration of the vehicle, environment of the vehicle during vehicle operation (e.g., traffic, construction, accidents in the area, weather or road conditions at the time of an accident or duration of vehicle use), and/or other information relating to use of the vehicle. Historical data may also describe vehicle-sharing application usage patterns of the vehicle owner. For example, historical data may also include mobile device data or other data indicating requests containing details of a rental trip that were approved or rejected by participating vehicle owners, and feedback or complaints submitted by the participating vehicle owners as to the treatment of their vehicles by the renters. Historical data collected by computing device 120 may be stored in vehicle-sharing platform database 128-1, and historical data collected by third-party servers may be stored in private database 128-2 and/or public database 128-3, for example.

In another aspect, one or more of databases 128-1, 128-2, . . . 128-N may store historical data that describes driving behaviors of prospective renters. Similar to the historical data that describes driving behavior of a vehicle owner mentioned above, historical data that describes driving behaviors of prospective renters may include vehicle collision data, geographic location data (e.g., GPS data), mobile device data, telematics data, vehicle mounted-sensor data, autonomous vehicle sensor data, environment data (e.g., traffic and/or weather data) and image data, which may be collected by the vehicle-sharing platform 100 by way of the computing device 120 and/or device 122, third party servers, or sensors associated with a renter's vehicle before, during, and/or after a trip.

In another aspect, historical data stored in the one or more databases 128-1, 128-2, . . . 128-N may include rental evaluation data that includes assessments of rental trips completed by the renters using the vehicle-sharing platform 100. The assessments may be automatically determined by the vehicle-sharing platform 100, or may be ratings, feedback, or comments for the renters provided by the vehicle owners from whom the renters have rented vehicles.

As with historical data relating to the vehicle owner, historical data relating to the renter that is collected by computing device 120 may be stored in vehicle-sharing platform database 128-1, and historical data collected by third-party servers may be stored in private database 128-2 and/or public database 128-3, for example. Rental evaluation data collected by computing device 120 may be stored in vehicle-sharing platform database 128-1, for example. It should be noted that, to comply with state, local, and/or federal privacy regulations, the computing device 120 may need to obtain the user's consent to store and/or access the historical data.

Private database 128-2 may include proprietary information or any suitable data related to the user that may be collected and/or mined from one or more sources that may not otherwise be readily or conveniently available via public channels. This propriety information may include, for example, information gathered from third party servers related to the user's driver's license suspensions, driving citations (e.g., moving violations) issued to the user, accident reports regarding details of accidents in which the user has been involved, the user's credit score history, claims data, vehicle event data recorder information or any suitable vehicle telematics data, and/or user account information such as credit card accounts, mortgages, financial institutions, for example. Claims data may be associated with actual insurance claims arising from real world vehicle collisions, and generally represents insurance claims filed by vehicle owners. Claims data may identify a particular collision, policy owners, involved vehicles, a location where the collision occurred, property involved, repair and/or replacement costs and/or estimates, a time and date of the collision, and/or various other information. In some embodiments, the computing device 120 may identify driving behavior of the renter by solely analyzing the telematics data of the vehicle being driven by the renter. Particularly, the computing device 120 may analyze telematics data associated with the renter to identify driving behaviors of the renter, such as "low risk" driving tendencies (e.g., renter obeys the speed limit 90% of the time). Using the same immediate example, if claims data shows that the renter was involved in 3 accidents in a span one of year, an algorithm used by the computing device 120 may downgrade the "low risk" driving behavior to a "high risk" driving behavior based on a pre-determined weight assigned to the claims data.

Although some of this information may be publicly available, this information may not be easily obtained online and/or may need to be appropriately formatted for database storage. Therefore, examples of third party sources of such proprietary information may include any suitable source of census reports, crime reports, weather reports, vehicle history reports, etc. As mentioned above, to comply with state, local, and/or federal privacy regulations, the computing device 120 may need to obtain the user's consent to access this information via GUI 119.

Public database 128-3 may represent one or more public data sources. Database 128-3 may include information about the user (e.g., a participating renter) that is readily available via one or more public channels. Examples of public data source information may include a user's current address, current occupation, marital status, etc. Examples of the public data sources may include city record data, and publicly available social networking data, such as data collected from a networking website such as LinkedIn.com, for example.

Prior to storage in the databases 128-1, 128-2, . . . 128-N, some of the historical data and/or rental evaluation data may have been uploaded to the computing device 120 via the network 106 from the devices 122, 123, third party servers, and/or sensors associated with a vehicle. Additionally, or alternatively, some of the data may have been generated by the computing device 120. The computing device 120 may store data in the databases 128-1, 128-2, . . . 128-N and/or may access data stored in the databases 128-1, 128-2, . . . 128-N when executing various functions and tasks associated with the methods described herein.

In accordance with various aspects, computing device 120 may facilitate the collection of information (e.g., identity data including a user name and password affiliated with an account profile) from a vehicle owner and/or historical data of the vehicle owner from one or more of databases 128-1, 128-2, . . . 128-N. Analysis of the historical data stored in databases 128-1, 128-2, . . . 128-N may be used to identify and evaluate driving behavior(s) of the renter and a corresponding state of an environment of the vehicle when the driving behavior(s) occurred. Computing device 120 may generate one or more renter eligibility values corresponding to the identification and/or evaluation of the driving behavior(s) of the renter. For example, a renter's driving behavior may be evaluated (e.g., scored) for driving in particular types of ambient conditions (e.g., separate context-specific driving scores for driving in dense or light traffic, in particular temperatures, on snow-covered, ice-covered or wet roads, in low or high visibility conditions, in low or high wind conditions, in rainy or snowy weather, high elevation, etc.). In some embodiments, a single driving context may incorporate multiple factors. For example, a context-specific driving score may be calculated for driving behavior while driving on a rural road at speeds greater than 35 miles per hour in snowy weather, another context-specific driving score may be calculated for driving behavior while driving on an interstate highway in rainy weather with cruise control activated, and so on.

As will be further described below, the computing device 120, by executing a context engine (CE) 125, may be configured to compare the one or more renter eligibility values (e.g., one or more driving scores) to a vehicle owner's context-specific user preferences that define one or more criteria for vehicle renters with whom the vehicle can be shared. If a particular renter satisfies the one or more criteria, the renter may view an indication on the renter's mobile device that the owner's vehicle is available for rent.

Exemplary Driving Behavior Identification Based Upon Analyzing Telematics Data

Figure 2:
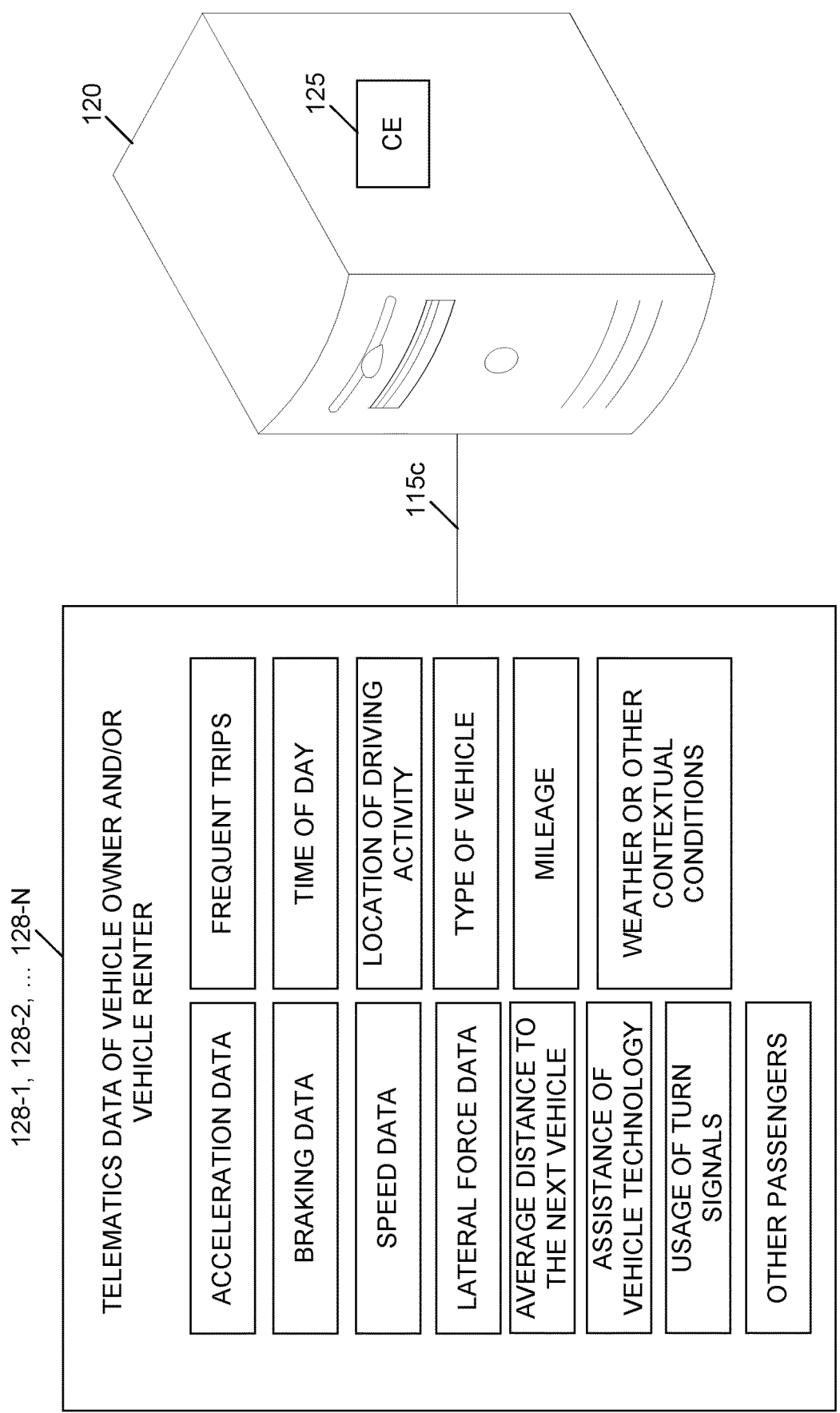
FIG. 2 illustrates a block diagram of exemplary driving behavior identification based upon analyzing telematics data.

As shown in FIG. 2, the telematics data and/or other historical data that is gathered by computing device 120 may generally indicate various levels of driving behavior for a user (i.e., vehicle owner or vehicle renter). The telematics data and/or other historical data may indicate the user's driving behavior with respect to vehicle operations, such as the following: braking (deceleration); speed; acceleration; turning; average distance to the next vehicle—whether ahead, behind, or adjacent (e.g., traveling along side in the same direction of traffic); usage of vehicle technology (such as accident avoidance technology); usage of turn signals; and/or other driving characteristics. The data may also indicate various contexts in which the vehicle operations occurred, such as whether a user is driving alone or with other passengers at particular times; the particular roads taken during a commute to or from work; time of day information; the location(s) where particular drives occur; the weather conditions that exist for a particular drive; whether the user is driving adjacent to other vehicles traveling in the same direction at a particular time (such as on a four-lane highway); whether the user is driving too slow or too fast in relation to the posted speed limit, and so on.

Telematics data from a vehicle that was once owned or driven by the vehicle renter may be analyzed to determine the driving behavior of the vehicle renter, and similarly, telematics data from a vehicle owned by the vehicle owner may be analyzed to determine the driving behavior of the vehicle owner. In some embodiments, the computing device 120 may be programmed to detect one or more sets of operation data (e.g., acceleration data, braking data, speeding data) within the telematics data, apply pre-configured weights to each of the one or more sets of operation data, and calculate a driving score representative of the sum of the weighted set(s) of operation data. The computing device 120 may be configured to designate a user who drives over the speed limit or tailgates too frequently (e.g., as shown by the frequent braking) with a high driving score, which may indicate risk-prone driving behavior. Similarly, the computing device 120 may be configured to designate a user who drives less than the speed limit or only drives during the day time with a low driving score, which may indicate risk-averse driving behavior. Accordingly, computing device 120 may evaluate and/or analyze the telematics data to identify low risk driving, high risk driving, or any suitable risk levels associated with the user.

The computing device 120 may also be configured to evaluate the telematics data, by calculating one or more context-specific driving scores corresponding to one or more portions of the telematics data. For example, the computing device 120 may generally be configured to determine a separate context-specific driving score for each of one or more "contexts" in which a particular vehicle is driven. In some embodiments, for example, computing device 120 may calculate a context-specific driving score that specifically corresponds to a particular type of ambient condition in which the vehicle is driven. Various more specific (but still non-limiting) examples may include calculating context-specific separate driving scores for driving behavior in dense or light traffic, in particular temperature ranges, in snowy road conditions, in icy road conditions, in wet road conditions, in low visibility conditions, in high visibility conditions, in low wind conditions, in high wind conditions, while raining, while snowing, during the day, during the night, etc.

The context(s) for which scoring should be performed may be determined by a computing device 120. In some embodiments, the computing device 120 may identify the applicable context(s) by detecting preferences of the context(s) from vehicle-sharing platform profiles associated with vehicle owners. Vehicle owners may select the desired context(s) for scoring via GUI 119. In various embodiments, the vehicle owners may enter the desired scoring context(s) by typing in recognized codes or labels for the context(s) (e.g., "snowy conditions" for driving on in snowy conditions), and/or by selecting contexts from a predetermined set of contexts (e.g., selecting one or more contexts from a dropdown menu).

When scoring driving behavior for a particular renter, and for a particular context determined by computing device 120, computing device 120 may identify the portion of the vehicle telematics data that corresponds to the times and/or locations when the vehicle was driven in that context. If the context is "snowy conditions," for example, the computing device 120 may identify the telematics data that reflects the state, operation and/or environment of the vehicle and/or driver (e.g., acceleration data, braking data, steering data, etc.) at times and/or locations when the vehicle was being driven on snowy roads (e.g., according to weather data). As another example, if the context is "urban density," the computing device 120 may identify the telematics data that reflects the state, operation and/or environment of the vehicle and/or driver at times and/or locations when the vehicle was being driven in an urban city, such as New York City (e.g., according to GPS data).

Computing device 120 may identify which portion of the telematics data corresponds to a particular context in different ways according to various different embodiments. If the context relates to ambient conditions while the vehicle is being driven on a particular route, for example, computing device 120 may utilize GPS information from the vehicle, along with information from another source identifying the locations at which the context exists. For example, computing device 120 may utilize the API of a mapping software application that supports communication with a mapping server. The mapping server may provide metadata in connection with various locations depicted on a digital map, such as road types (e.g., whether a road is a rural road, the number of highway lanes, the locations of on ramps and off ramps, etc.). As another example, computing device 120 may utilize the APIs of software applications that allow computing device 120 to obtain information on weather conditions in particular areas, road conditions in particular areas, traffic conditions in particular areas, etc. The information may be accompanied by time/date information, which computing device 120 may then compare to time stamps in the GPS data to determine when or whether a particular ambient condition existed for the vehicle. Alternatively, or additionally, computing device 120 may determine the context from the telematics data itself. For example, computing device 120 may process external sensor (e.g., video camera) data to identify whether the vehicle is driving on a particular type of road, in particular weather conditions, etc. Computing device 120 may then check time stamps or other temporal information associated with the telematics data to determine which telematics data was generated while the context existed, for example.

Once the appropriate portion of the telematics data is identified, computing device 120 may analyze the data portion (and possibly data from other sources, such as weather data, traffic data, etc.) to determine a context-specific driving score. Computing device 120 may determine the context-specific driving score according to a scoring algorithm stored in a persistent memory. The scoring algorithm may specify that the context-specific driving score be calculated based on driving behavior with respect to acceleration, braking and cornering during times and/or locations when the vehicle was driven in the determined context, for example. The scoring algorithm may specify that the context-specific driving score be calculated based on driving behavior with respect to any of numerous aspects of driving, (e.g., speed, acceleration, braking, steering and/or cornering), and conditions such as status of safety and/or automated vehicle control systems (e.g., forward collision warning system status, lane departure warning system status, adaptive cruise control status, electronic stability control status, when or whether the driver deactivates such a system, when or whether such a system activates or produces a warning, etc.), weather conditions (e.g., visibility, road friction index, snow cover index, ice cover index, wet/dry pavement index), traffic conditions (e.g., traffic density, traffic surge index, vehicle type index, etc.), and so on.

Computing device 120 may determine a different context-specific driving score for each of multiple contexts, and the scoring algorithm may specify one or more sets of rules for scoring driving behavior with respect to one or more contexts. Computing device 120 may also determine "trip" driving scores that are calculated based on raw or weighted driving scores for multiple contexts within a single trip, and/or may determine overall driver driving scores that are calculated based on multiple raw or weighted trip driving scores for a single driver. To this end, the scoring algorithm may also include an algorithm for combining context-specific driving scores to obtain trip driving scores, and/or for combining trip driving scores to obtain overall driver driving scores.

Context-specific driving scores determined by computing device 120 may be added to one of the databases 128-1, 128-2, . . . 128-N. Specifically, a vehicle-sharing platform profile for a renter may store the context-specific driving scores indicative of an evaluation of the renter's driving behavior as evaluated by the computing device 120 based upon the telematics data and/or other historical data.

To determine whether a prospective renter is eligible to rent an owner's vehicle, computing device 120 may compare the context-specific driving scores against one or more user preference values stored in a vehicle-sharing platform profile associated with the vehicle owner. For example, computing device 120 may determine that a prospective renter is ineligible to rent the owner's vehicle if a context-specific driving score falls below one or more user preference values. As another example, in an embodiment where each context-specific driving score is calculated based on sub-scores for acceleration, braking and cornering while driving in the driving context, computing device 120 may determine that a prospective renter is eligible to rent the owner's vehicle if any one of the sub-scores is above corresponding user preference values.

In an embodiment, the computing device 120 may automatically set predefined user preference values for the vehicle owner based on the telematics data associated with the vehicle owner. For instance, if the telematics data shows that the vehicle owner has traveled in snowy conditions often, a user preference value specific to snowy conditions may be predefined. In some embodiments, the vehicle owner may adjust one or more of the predefined preference values applied by the computing device 120. The vehicle owner may adjust predefined preference values via GUI 119, for example.

Exemplary Computing Device with CE

Figure 3:
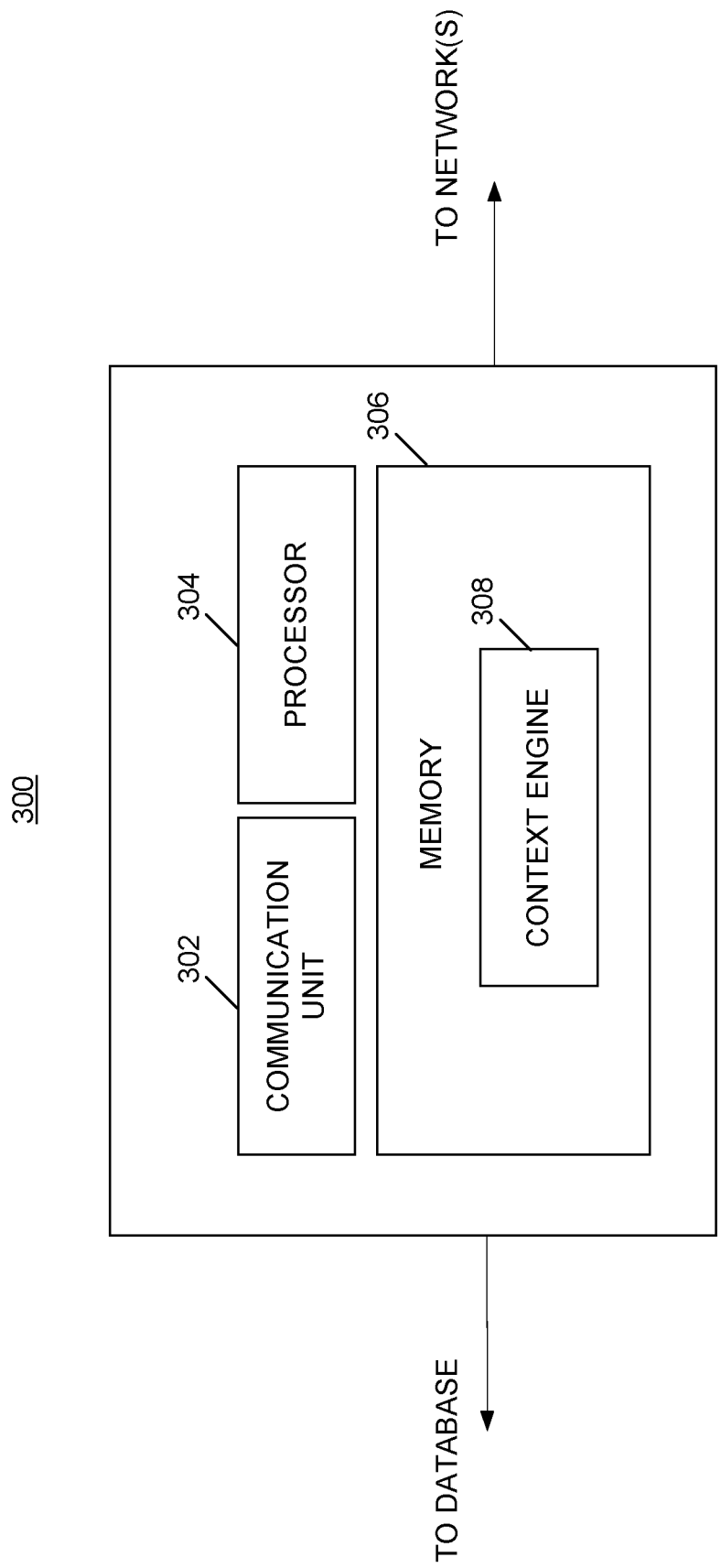
FIG. 3 illustrates a block diagram of an exemplary computing device having a preference prediction engine in accordance with one aspect of the present disclosure.

FIG. 3 illustrates a block diagram of an exemplary computing device 300 (e.g., computing device 120 of FIG. 1) in accordance with an exemplary aspect of the present disclosure. Computing device 300 includes communication unit 302, processor 304, and memory 306. Memory 306 may store a context engine (CE) 308 (e.g., CE 125 of FIG. 1). The computing device 300 may include additional, fewer, or alternate components, including those discussed elsewhere herein.

Computing device 300 may be implemented as any suitable computing or mobile device. For example, computing device 300 may be implemented within one or more servers.

Communication unit 302 may be configured to facilitate data communications between CE 308 and one or more databases and/or networks, such as one or more of databases 128-1, 128-2, . . . 128-N and/or network 106, as previously discussed with reference to FIG. 1, for example. Communication unit 302 may be configured to facilitate such communications in accordance with any suitable communication protocol or combination of protocols. In various aspects, communication unit 302 may be configured to utilize the same or different communication protocols to facilitate respective communications between one or more databases 128-1, 128-2, . . . 128-N and network 106. In an aspect, communication unit 302 may be configured to send data to front end devices 102, for example, as shown in FIG. 1.

Communication unit 302 may send data in accordance with one or more applications (e.g., vehicle-sharing applications) executed on one or more devices that are part of the front end devices 102, such as devices 122, 123 as shown in FIG. 1. In some embodiments, communication unit 302 may send data that enables owner device 123 to display user preferences in accordance with embodiments described herein. In some embodiments, communication unit 302 may send data that enables renter device 122 to display renter eligibility values in accordance with embodiments described herein. Communication unit 302 may also be configured to receive data from one or more devices, such as devices 122, 123 as shown in FIG. 1.

The data received from renter device 122 may be processed by processor 304 and utilized to identify that the renter has requested to rent a vehicle from a vehicle owner satisfying the owner's user preferences.

As will be appreciated by those of ordinary skill in the relevant art(s), communication unit 302 may be implemented with any combination of suitable hardware, firmware and/or software to enable these functions. For example, communication unit 302 may be implemented with any number of wired and/or wireless transceivers, network interfaces, physical layers (PHY), etc. Communication unit 302 may optionally enable communications between CE 308 and one or more additional networks, which may or may not be part of network 106. For example, communication unit 302 may be configured to communicate with cellular networks in addition to network 106.

Processor 304 may be configured to communicate with memory 306 to store to and read data from memory 306. In accordance with various aspects, memory 306 is a computer-readable non-transitory storage device that may include any combination of volatile memory (e.g., a random access memory (RAM)) and/or non-volatile memory (e.g., battery-backed RAM, FLASH, etc.). Memory 306 may be configured to store instructions executable on processor 304. These instructions may include machine readable instructions that, when executed by processor 304, cause processor 304 to perform various acts. CE 308 stored in memory 306 may specifically be configured to store instructions executable by processor 304 to determine renter eligibility.

For example, CE 308 may include instructions and/or algorithms that, when executed by processor 304, cause processor 304 to retrieve data from one or more of databases 128-1, 128-2, . . . 128-N to determine rental eligibility, as discussed above in connection with FIGS. 1 and 2. The executable instructions may enable communications unit 302 to send data to renter device 122 that causes renter device 122 to display rental eligibility values and/or to owner device 123 that causes owner device 123 to display user preference values.

Exemplary User Navigation Path Using Vehicle-Sharing Platform

Figure 4:
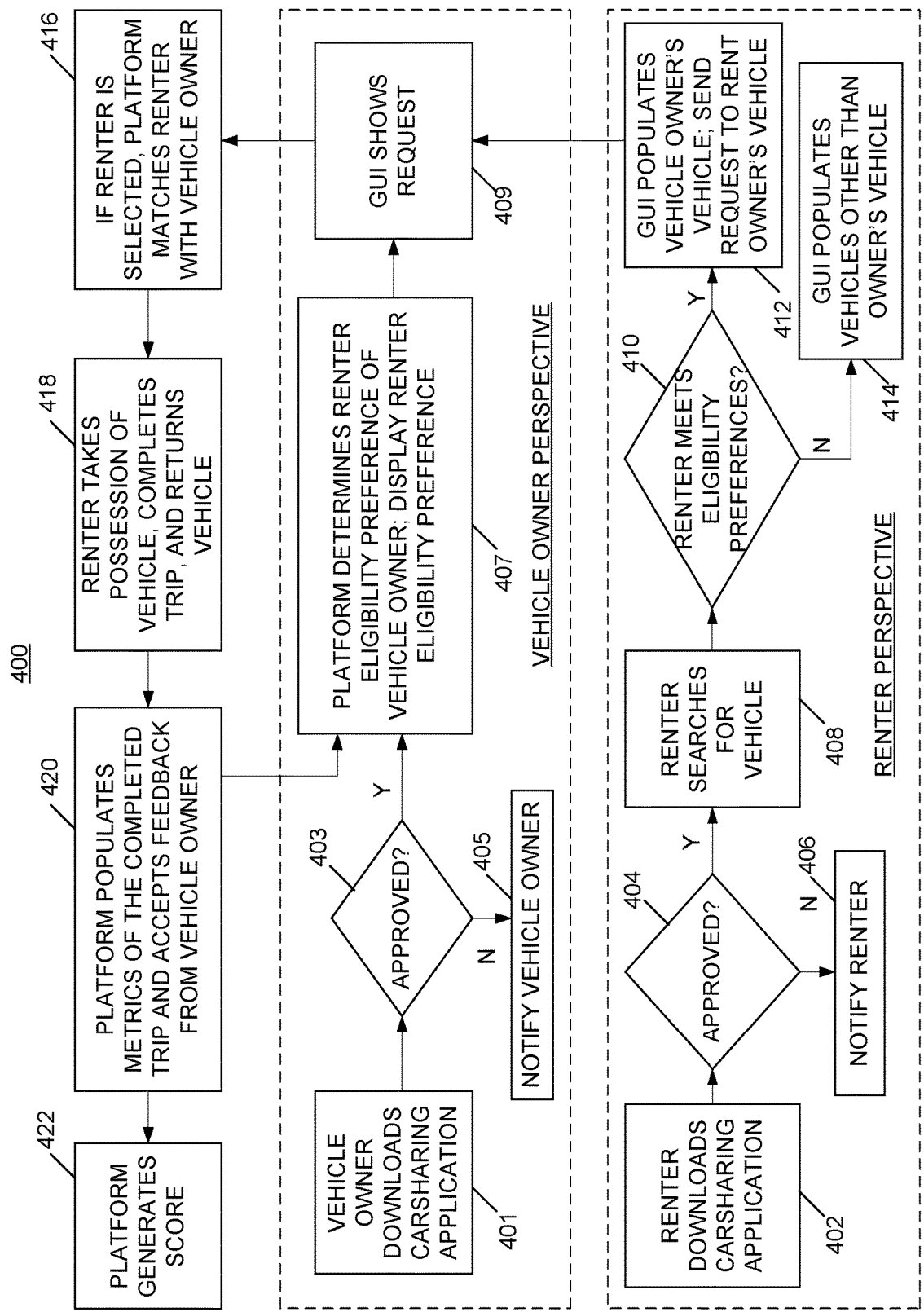
FIG. 4 illustrates a flow diagram of exemplary user navigation paths in accordance with one aspect of the present disclosure.

FIG. 4 illustrates a flow diagram 400 of exemplary user navigation paths from the perspective of both the vehicle owner and renter for facilitating vehicle-sharing between the two parties in accordance with an exemplary aspect of the present disclosure.

Flow diagram 400 may begin with the vehicle owner and renter each downloading a P2P vehicle-sharing application (e.g., dedicated application 121) using their respective devices (e.g., devices 123, 122), as shown in blocks 401 and 402, respectively, in order to participate in the vehicle-sharing platform (e.g., vehicle-sharing platform 100). The vehicle-sharing platform may perform an approval process, as shown in blocks 403 and 404, by requiring each party to accept terms of usage and/or pass one or more background checks (e.g., age check, valid driver's license check, criminal background check, vehicle driving history, etc.). If any of the parties fails to pass the approval process, the vehicle-sharing platform may notify the ineligible party, as shown in blocks 405 and 406, and/or present reasons as to why the party failed the approval process. If any of the parties pass the approval process, the party may be considered as an active participant of the vehicle-sharing platform and may be given access to use the vehicle-sharing platform.

With respect to the renter, the vehicle-sharing platform 100 may receive an indication that the renter has agreed to terms, as part of the approval process, for renting a vehicle from the vehicle owner. The terms may include a notice that determining the renter's eligibility to rent vehicles may be based on previous driving behavior(s) of the renter. The terms may also include a notice that vehicle owners have the right to set and apply customized user preferences and/or other restrictions on their vehicles, and that the number of available vehicles for rent to the renter may be affected by how well various characteristics of the renter "fits" the vehicle owner's preferences. Accordingly, in some embodiments, the terms may include a notice that various data (e.g., historical data, rental evaluation data) may be collected (e.g., via renter device 122) and used in order to be granted access to the vehicle sharing platform 100 and/or to evaluate whether the renter "fits" the vehicle owner's preferences. The terms may include a notice that vehicle telematics data may be collected (e.g., via renter device 122) during the rental trip, and/or that penalties or incentives may be applied to the renter based upon the vehicle telematics data.

As shown in block 407, upon approval for participation in the vehicle-sharing platform 100, the vehicle-sharing platform may determine renter eligibility preferences (i.e., user preference values) of the vehicle owner based on telematics data associated with the owner. For example, the vehicle-sharing platform 100 or a component thereof (e.g., CE 125) may process the telematics data or a driving score stored in databases 128-1, 128-2, . . . , 128-N to determine the renter eligibility preference(s). Subsequently, the vehicle owner's device 123, via a GUI (e.g., GUI 119) of the vehicle-sharing application, may display the renter eligibility preferences.

The vehicle owner may set up a profile by creating a login name and password to describe the vehicle available for rent, specify a price to rent the vehicle, activate or deactivate the rental availability of the vehicle, and indicate renter eligibility preferences via the dedicated application 121. In one example scenario, if the vehicle owner lives in a city that snows during the winter season, the vehicle owner may desire to set renter eligibility preferences to indicate that the renter should have experience driving in snowy conditions. The user profile may be updated at any time by the vehicle owner. For example, when the summer season approaches, the vehicle owner may change the renter eligibility preferences to indicate that the renter need not have experience driving in snowy conditions. In other embodiments, the vehicle-sharing platform may automatically determine renter eligibility preferences of the vehicle owner by predicting the driving behavior of the vehicle owner based on telematics data associated with the vehicle owner. The vehicle-sharing platform may process the telematics data or a driving score stored in databases 128-1, 128-2, . . . 128-N to determine the driving behavior. For example, if the driving score demonstrates safe driving behavior during snowy conditions, it may be assumed that the vehicle owner desires to rent out his vehicle to renters that also exhibit safe driving behavior during snowy conditions. The vehicle-sharing platform may adopt the driving behaviors of the vehicle owner and translate such driving behaviors into renter eligibility preferences. Continuing the example above, the prospective renter may be eligible if he or she exhibited safe driving behavior during snowy conditions, as gathered from telematics data or a context-specific driving score stored in databases 128-1, 128-2, . . . 128-N.

Upon approval for participation in the vehicle-sharing platform 100, the renter's device (e.g., device 122), via a GUI (e.g., GUI 119) of the vehicle-sharing application, may display a search portal for the renter to input details (e.g., which type of vehicle he desires, pick-up location, day, and time, drop-off location, day, and time, etc.) for a rental vehicle request, thereby allowing the renter to search for vehicles as shown in block 408. The vehicle-sharing platform 100 (e.g., computing device 120), based upon the input details provided by the renter, may search for available vehicles based upon the rental vehicle request by querying a database (e.g., database 128-1) against the input details and present any available vehicles in a results page.

In order to determine whether the owner's vehicle should appear as an available vehicle on the renter's results page, computing device 120 may determine, as shown in block 410, whether the renter (i.e., qualifications of the renter, as described by telematics and/or other historical data, and/or by rental evaluation data) and/or input details of the rental vehicle request satisfy the vehicle owner's renter eligibility preferences that were determined in block 407. If the renter and/or input details satisfy the vehicle owner's preferences, the renter's results page may display the vehicle owner's vehicle as available, as shown in block 412. The renter may proceed by selecting the owner's vehicle to rent, selecting other vehicles available from other vehicle owners that the renter may be qualified to rent, or may decide not to select any vehicles. If the renter and/or input details do not satisfy the vehicle owner preferences, the renter's results page may not display the vehicle owner's vehicle as available, as shown in block 414, but may otherwise display other vehicles available from other vehicle owners that the renter may be qualified to rent.

Upon selecting the owner's vehicle to rent and subsequently sending a request to the vehicle owner via the renter's device across a network (e.g., network 106), as shown in block 412, the GUI shown on the vehicle owner's device (e.g., device 123) may populate the request, as shown in block 409. The computing device 120, for example, may facilitate the transfer of the request between the renter's device and the vehicle owner's device (e.g., by receiving the request from renter device 122 and forwarding the request to owner device 123). The request may include some or all of the input details described above. In some embodiments, the request may also include a context-specific driving score of the renter, which may be determined in a similar manner in which a context-specific driving score of the vehicle owner may be determined, by historical telematics data from previous trips taken by the renter. If the request is automatically approved or the vehicle owner decides to accept the request, the computing device 120 may match the renter with the vehicle owner, as shown in block 416, to facilitate coordination of the vehicle sharing and communication between the two parties. In some embodiments, the vehicle-sharing platform may enable in-app messaging to facilitate communications (e.g., via text messages) between the renter and vehicle owner upon a match.

As shown in block 418, the renter may proceed to physically take possession of the owner's vehicle at the designated agreed upon day, time, and pick-up location, and return the owner's vehicle at the end of the trip at the designated agreed upon day, time, and drop-off location. During the rental trip, the vehicle-sharing platform may generate telematics data of the vehicle via sensors associated with the vehicle and/or the renter's device (e.g., device 122) that may be present in the vehicle during the rental trip. At the end of the rental trip, the vehicle-sharing platform may utilize location-tracking technologies (e.g., GPS) of the vehicle to confirm that the vehicle has been dropped-off at the correct location.

The vehicle-sharing platform may populate metrics of the completed trip and accept feedback from the vehicle owner as shown in block 420, and calculate a driving score for the renter based upon the telematics data as shown in block 422. The metrics and/or score may be populated as an in-app message and shared between the two parties, or may otherwise be delivered to notify the vehicle owner and/or vehicle renter. The driving score may also take into consideration any feedback from the vehicle owner. For example, if the vehicle has scratches on the car that were not there prior to the rental trip, or if the interior of the vehicle has been damaged, the driving score may be lowered. If the vehicle is in the same condition as it was prior to the rental trip, or if the renter took measures to improve the conditions of the vehicle (e.g., cleaned the car), the driving score may be increased.

Figure 5:
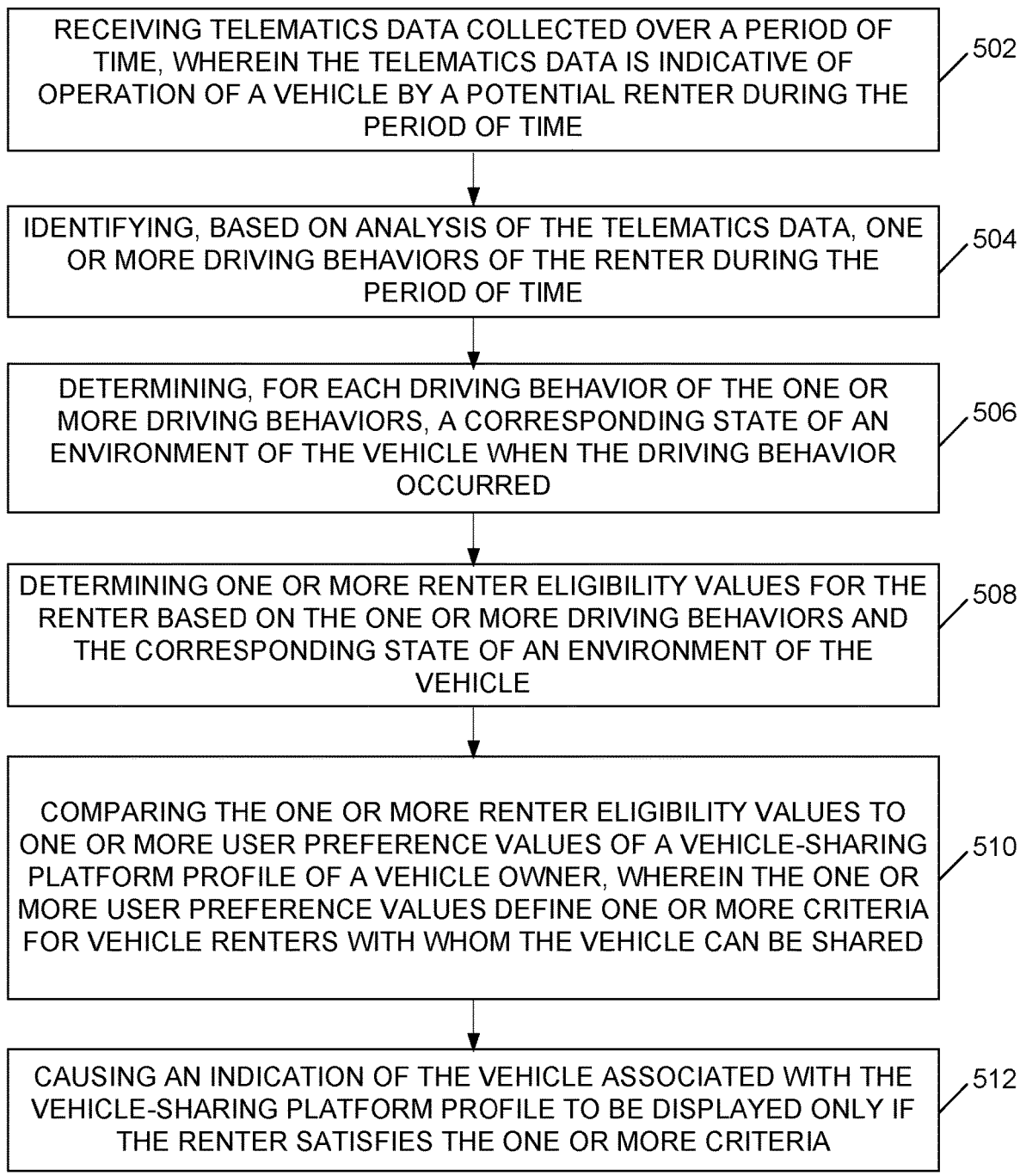
FIG. 5 illustrates an exemplary method performed by an exemplary vehicle-sharing platform or component(s) thereof in accordance with one aspect of the present disclosure.

Exemplary Methods of Determining Renter Eligibility Based on Contextual Telematics Data for a Vehicle-Sharing Platform FIG. 5 illustrates an example method 500 in accordance with an exemplary aspect of the present disclosure. Method 500 may be performed by exemplary vehicle-sharing platform 100, and more particularly, by computing device 120 of FIG. 1, for example.

Method 500 may receive telematics data collected over a period of time (block 502). The telematics data may be indicative of operation of a vehicle by a potential renter during the period of time, which may or may not be a contiguous, uninterrupted time period. One of ordinary skill in the art would recognize that the period of time may be a design choice. Generally, the greater the period of time (e.g., greater than 5 years), the more rich the telematics data may be, and therefore the driving behavior identified may be more accurate. Other types of data may be collected, such as any of the historical data described above (e.g., weather data, environment data).

Method 500 may then analyze the telematics data to identify one or more driving behaviors of the renter during the period of time (block 504). To do so, method 500 may determine one or more values associated with acceleration, speed, or lateral force corresponding to the one or more driving behaviors, such as accelerating behavior, braking behavior, or turning behavior.

Method 500 may then determine, for each driving behavior of the one or more driving behaviors, a corresponding state of an environment of the vehicle when the driving behavior occurred (block 506). The environment may refer to the visibility conditions, weather conditions, traffic conditions, road conditions, or other suitable conditions experienced by the driver and the vehicle. The corresponding state of an environment may be determined based on telematics data in some embodiments, and/or based on environment data received from a third party server.

To specifically determine a state of an environment of the vehicle when a driving behavior occurred, the platform 100 may determine one or more times/locations associated with the driving behavior, and a portion of the telematics data and/or environment data corresponding to the one or more times and/or one or more locations associated with the driving behavior. For example, if telematics data indicates that the vehicle traversed a path on December $24^{th}$ in Chicago at 5:35 pm to 6:22 pm, and locale-specific weather data from a third party server indicates that there was 8 inches of snowfall in Chicago at that date and time, the platform 100 may determine that the state of the environment of the vehicle when the driving behavior occurred included snowy road conditions. As another example, if the telematics data includes image data collected by sensors associated with a vehicle, the platform 100 may not need to collect environment data from the third party server, and may instead identify the weather conditions by processing the image data.

Method 500 may then determine rental eligibility values for the renter based on the one or more driving behaviors and the corresponding state of an environment of the renter's vehicle (block 508). In some embodiments, the values may simply be binary representations, such as "1" or "0," indicating that the renter's vehicle traversed or did not traverse certain kinds of environments at least once, respectively. For example, if the renter has driven through snowy conditions and rainy conditions at least once, then rental eligibility for the driver may be represented as <1, 1>. In some embodiments, the platform 100 may be configured with a threshold, where the renter must traverse through a particular environment a number of times equal to or greater than the threshold to have qualified as traversing through the environment. For example, if the threshold is "50" and the driver's behavior indicates that he has driven in snowy conditions 3 times and rainy conditions 105 times, the rental eligibility for the driver may be represented as <0, 1>. In yet other embodiments, the rental eligibility for the driver may be based on an evaluation of the driving behavior(s) in the context of the environments, as indicated by the context-specific driving scores described herein. Continuing with the immediately preceding examples, if the context-specific driving scores on a scale from 0 (high risk) to 1 (low risk) for snowy conditions and rainy conditions indicate low-risk behavior, the rental eligibility for the driver may be represented as <0.92, 0.87>.

It should be noted that although the rental eligibility is described with vector representation for ease of illustration, one of ordinary skill in the art would understand that rental eligibility may be represented in other notations or representations depending on the implementations of the vehicle-sharing platform described herein.

In some embodiments, renter eligibility values may be displayed via a suitable GUI (e.g., GUI 119) running on a suitable device (e.g., renter device 122), for example.

Method 500 may then compare the one or more renter eligibility values to one or more user preference values of a vehicle-sharing platform profile of a vehicle owner (block 510). The one or more user preference values may define one or more criteria for vehicle renters with whom the vehicle can be shared. In an embodiment, the vehicle-sharing platform may receive profile data associated with participating vehicle owners from vehicle-sharing platform database 128-1, and subsequently compare the one or more renter eligibility values to one or more user preference values included in the profile data associated with participating vehicle owners. Such user preference values may be input by participating vehicle owners after logging into their accounts within the vehicle-sharing platform, may otherwise be automatically generated by the vehicle-sharing platform based on historical data associated with participating vehicle owners, or may otherwise be displayed via a suitable GUI (e.g., GUI 119) running on a suitable device (e.g., owner device 123).

In an embodiment, a vehicle owner's user preference value(s) may correspond to driving condition(s) that the potential renter needs to have experienced while driving. For example, a vehicle owner's user preference values may be set to <0, 1> to indicate that the renter needs to have experience driving in rainy conditions (e.g., with a threshold value set to 50 trips in rainy conditions) but does not need to have experience driving in snowy conditions. These values may be compared with a renter's eligibility values of <0, 1>, which may result from the renter having driven in snowy conditions 3 times and rainy conditions 105 times. As another example, a vehicle owner's renter eligibility preferences values may be set to <1, 0> to indicate that the renter needs to have minimum experience driving in snowy conditions (e.g., with a threshold value set to 5 trips in snowy conditions) but does not need to have experience driving in rainy conditions. These values may be compared with a renter's eligibility values of <0, 1>, which may result from the renter having driven in snowy conditions 3 times and rainy conditions 105 times. In yet another example, a vehicle owner's renter eligibility preferences value may be set to <0.8> to indicate that the renter needs to have an excellent driving score driving in snowy conditions (e.g., with a context score value, such as "0.8"). This value may be compared with a renter's eligibility value of <0.92>, which may result from the renter having exhibited low-risk driving behaviors in snowy conditions.

In another embodiment, a vehicle owner's user preference value(s) may correspond to a renter's behavior with respect to vehicle operations, such as braking, speeding, turning, etc., without necessarily corresponding to a particular context. For example, a vehicle owner's user preference may indicate that a potential renter needs to have few hard braking events in order to rent the owner's vehicle. However, context (e.g., driving conditions) may still affect the driving behavior, in these embodiments. For example, a driver taking a local route during rush hour may have more hard braking events than a driver taking a highway route during non-peak hours. Both drivers may generally be exhibiting safe driving behavior, but the former driver may be unintentionally deemed ineligible to rent the owner's vehicle if the owner's user preference values indicate that the renter needs to have few hard braking events. To not penalize the former driver, the computing device 120 may excuse certain driving behaviors (e.g., hard braking events, speeding) of the potential renter that occurred in certain contexts related to traffic, weather, etc. That is, the computing device 120 may adjust the rental eligibility values identified in block 508, so that the rental eligibility values are a fair measure with respect to certain contexts.

Method 500 may then cause an indication of the vehicle associated with the vehicle-sharing platform profile to be displayed only if the renter satisfies the one or more criteria of the owner (block 512). If the renter satisfies the one or more criteria of the owner, for example, the make, year, and/or model of the vehicle may appear in a list with other vehicles available for rent. As another example, an image of the vehicle may be displayed. Other suitable ways of graphically indicating that the vehicle is available to the renter via the vehicle-sharing application are also contemplated. In some embodiments, if the renter satisfies the one or more criteria defined by the renter eligibility preferences values, the platform 100 may transmit a message to the owner and/or the renter, indicating that the renter satisfies the one or more criteria.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain aspects are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering aspects in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In aspects in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example aspects, the processor or processors may be located in a single location (e.g., within a home environment, an office environment or as a server farm), while in other aspects the processors may be distributed across a number of locations.

The one or more processors may also operate to support performance of the relevant operations in a "cloud computing" environment or as a Software as a service (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other example aspects, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

Some aspects may be described using the expression "coupled" and "connected" along with their derivatives. For example, some aspects may be described using the term "coupled" to indicate that two or more elements are in direct physical or electrical contact. The term "coupled," however, may also mean that two or more elements are not in direct contact with each other, but yet still co-operate or interact with each other. The aspects are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, condition A or B is satisfied by any one of the following: A is true (or present) and B is false (or not present), A is false (or not present) and B is true (or present), and both A and B are true (or present).

In addition, use of the "a" or "an" are employed to describe elements and components of the aspects herein. This is done merely for convenience and to give a general sense of the description. This description should be read to include one or at least one and the singular also includes the plural unless it is obvious that it is meant otherwise.

Also, the patent claims at the end of this patent application are not intended to be construed under 35 U.S.C. § 112(f) unless traditional means-plus-function language is expressly recited, such as "means for" or "step for" language being explicitly recited in the claim(s).

Upon reading this disclosure, those of ordinary skill in the art will appreciate still additional alternative structural and functional designs for providing an interface to streamline a user's experience with a vehicle sharing application through the disclosed principles herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method of determining renter eligibility carried out by a vehicle-sharing platform, the method comprising:
    receiving, by one or more processors, telematics data from a sensor carried by a first vehicle, wherein the telematics data is indicative of operation of the first vehicle by a potential renter during a first period of time;
    identifying, by the one or more processors and based on the telematics data received from the sensor, one or more driving behaviors of the potential renter;
    determining, by the one or more processors, and for each driving behavior of the one or more driving behaviors, a corresponding state of an environment of the first vehicle existing when the driving behavior occurred;
    accessing, by the one or more processors, a profile of an owner of a second vehicle, wherein the profile includes one or more criteria of the owner, the one or more criteria:
        characterizing potential renters allowed to drive the second vehicle to one or more destinations during a second period of time, the one or more destinations being
            selected by the potential renters, and unknown to the owner prior to and during the second period of time, and
        remaining unchanged for each of the one or more destinations;
    determining, by the one or more processors and based at least in part on a location specified in the profile of the owner, a first state of the environment;
    identifying, by the one or more processors, a subset of the one or more driving behaviors associated with the first state of the environment;
    determining, by the one or more processors, one or more renter eligibility values for the potential renter based on the subset of the one or more driving behaviors;
    determining, by the one or more processors, that the one or more renter eligibility values satisfies the one or more criteria; and
    causing, by the one or more processors, an indication of the second vehicle to be displayed on an electronic device of the potential renter based on the one or more renter eligibility values satisfying the one or more criteria.

2. The computer-implemented method of claim 1, wherein determining the corresponding state of the environment includes determining the corresponding state of the environment based on the telematics data.

3. The computer-implemented method of claim 1, wherein determining the corresponding state of the environment includes determining the corresponding state of the environment based on environment data received from a third-party server.

4. The computer-implemented method of claim 3, further comprising:
    determining, by the one or more processors and based on the telematics data, and for each driving behavior of the one or more driving behaviors, one or more times and/or one or more locations associated with the driving behavior,
    wherein determining, for each driving behavior of the one or more driving behaviors, the corresponding state of the environment includes determining the corresponding state of the environment based on a portion of the environment data corresponding to the one or more times and/or one or more locations associated with the driving behavior.

5. The computer-implemented method of claim 1, wherein determining the one or more renter eligibility values for the potential renter includes:
    determining one or more values corresponding to the one or more driving behaviors during the first period of time, wherein each of the one or more values is associated with one or more of: acceleration, speed, or lateral force; and
    comparing the one of more values corresponding to the one or more driving behaviors to one or more threshold values.

6. The computer-implemented method of claim 1, further comprising:
    causing, by the one or more processors, an electronic message to be transmitted to the owner of the second vehicle or the potential renter, wherein the electronic message indicates that the potential renter satisfies the one or more criteria.

7. The computer-implemented method of claim 1, wherein at least one of the corresponding states of the environment is associated with one or more of: visibility conditions, weather conditions, traffic conditions, or road conditions.

8. A computer system implementing a vehicle-sharing platform for determining renter eligibility, the computer system comprising:
    one or more processors; and
    memory coupled to the one or more processors and storing executable instructions that when executed by the one or more processors cause the computer system to:
        receive telematics data from a sensor carried by a first vehicle, wherein the telematics data is indicative of operation of the first vehicle by a potential renter during a first period of time;
        identify, based on the telematics data received from the sensor, one or more driving behaviors of the potential renter;
        determine, for each driving behavior of the one or more driving behaviors, a corresponding state of an environment of the first vehicle existing when the driving behavior occurred;
        access a profile of an owner of a second vehicle, wherein the profile includes one or more criteria of the owner, the one or more criteria:

characterizing potential renters allowed to drive the second vehicle to one or more destinations during a second period of time, the one or more destinations being
  selected by the potential renters, and
  unknown to the owner prior to and during the second period of time, and
  remaining unchanged for each of the one or more destinations;
determine, based at least in part on a location specified in the profile of the owner, a first state of the environment;
identify a subset of the one or more driving behaviors associated with the first state of the environment;
determine one or more renter eligibility values for the potential renter based on the subset of the one or more driving behaviors;
determine that the one or more renter eligibility values satisfies the one or more criteria; and
cause an indication of the second vehicle to be displayed on an electronic device of the potential renter based on the one or more renter eligibility values satisfying the one or more criteria.

9. The computer system of claim 8, wherein the executable instructions further cause the computer system to:
cause an electronic message to be transmitted to the owner of the second vehicle or the potential renter, wherein the electronic message indicates that the potential renter satisfies the one or more criteria.

10. The computer system of claim 8, wherein at least one of the one or more driving behaviors is associated with one or more of: turning behavior, braking behavior, or accelerating behavior.

11. The computer system of claim 8, wherein the executable instructions further cause the computer system to:
determine, based on the one or more driving behaviors and the corresponding states of the environment, a driving score associated with the potential renter,
wherein the executable instructions cause the computer system to determine the one or more renter eligibility values for the potential renter based at least in part on the driving score.

12. The computer-implemented method of claim 1, wherein the sensor comprises an accelerometer included in a mobile communication device of the potential renter.

13. The computer-implemented method of claim 1, wherein at least one of the one or more driving behaviors is associated with: an average distance to an adjoining vehicle, a usage of turn signals, or a usage of driver-assistance technology provided by the first vehicle.

14. The computer system of claim 8, wherein the executable instructions further cause the computer system to:
identify a first portion of the telematics data corresponding to a first state of the environment;
determine a first driving score based on the first portion of the telematics data;
identify a second portion of the telematics data corresponding to a second state of the environment different from the first state of the environment; and
determine a second driving score, different from the first driving score, based on the second portion of the telematics data,
wherein the one or more renter eligibility values for the potential renter are determined based at least in part on the first driving score and the second driving score.

15. The computer-implemented method of claim 1, wherein the indication of the second vehicle is presented on the electronic device of the potential renter based on the one or more renter eligibility values satisfying the one or more criteria.

16. The computer-implemented method of claim 1, wherein the one or more driving behaviors are a first set of driving behaviors, the method further comprising:
receiving, by the one or more processors, status data from an automated vehicle safety system of the first vehicle, wherein the status data is indicative of operation of the first vehicle by the potential renter during the first period of time; and
identifying, by the one or more processors and based on the status data, a second set of driving behaviors of the potential renter,
wherein the renter eligibility values for the potential renter are further based on the second set of driving behaviors.

17. The computer-implemented method of claim 16, wherein the status data includes one or more of: forward collision warning system status, lane departure warning system status, adaptive cruise control status, electronic stability control status, deactivation of the automated vehicle safety system, or a warning generated by the automated vehicle safety system.

18. The computer-implemented method of claim 1, further comprising:
receiving, by the one or more processors, historical data indicative of vehicle operation associated with the owner of the second vehicle;
identifying, by the one or more processors and based on the historical data, a driving behavior of the owner; and
determining, by the one or more processors and based on the driving behavior of the owner, at least one criterion of the one or more criteria.

19. The computer system of claim 8, wherein the first state of the environment is selected by the owner, from a predetermined set of states of the environment, via a user interface operating on a mobile device of the owner.

20. The computer system of claim 8, wherein determining the one or more renter eligibility values for the potential renter further comprises:
identifying, by the one or more processors, a set of driving behaviors comprising unacceptable driving behaviors; and
determining, by the one or more processors, that at least one driving behavior of the set of driving behaviors is acceptable under the first state of the environment,
wherein the one or more renter eligibility values are determined without assigning a penalty for the at least one driving behavior.

* * * * *